US010106006B2

(12) United States Patent
Andou et al.

(10) Patent No.: US 10,106,006 B2
(45) Date of Patent: Oct. 23, 2018

(54) REAR SUSPENSION STRUCTURE OF AUTOMOTIVE VEHICLE

(71) Applicant: MAZDA MOTOR CORPORATION, Hiroshima (JP)

(72) Inventors: Fumitaka Andou, Hatsukaichi (JP); Norio Asano, Hiroshima (JP); Koji Takahashi, Kure (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 15/596,039

(22) Filed: May 16, 2017

(65) Prior Publication Data

US 2018/0001725 A1 Jan. 4, 2018

(30) Foreign Application Priority Data

Jul. 4, 2016 (JP) .................................. 2016-132654

(51) Int. Cl.
*B60G 3/04* (2006.01)
*B60G 7/04* (2006.01)
(Continued)

(52) U.S. Cl.
CPC ................. *B60G 7/04* (2013.01); *B60G 3/28* (2013.01); *B60G 7/001* (2013.01); *B60G 13/005* (2013.01);
(Continued)

(58) Field of Classification Search
CPC . B60G 3/28; B60G 7/001; B60G 7/04; B60G 13/005; B60G 2204/143; B60G 2200/18; B60G 2204/128
(Continued)

(56) References Cited

U.S. PATENT DOCUMENTS 5,873,587 A * 2/1999 Kawabe ................... B60G 3/20
280/124.135
6,305,700 B1 * 10/2001 Bruehl ..................... B60G 3/26
280/124.134
(Continued)

FOREIGN PATENT DOCUMENTS

EP 1937498 B2 11/2016
JP 2000-264032 A 9/2000
(Continued)

OTHER PUBLICATIONS

An Office Action; "Notification of Reasons for Refusal," mailed by the Japanese Patent Office dated Feb. 13, 2018, which corresponds to Japanese Patent Application No. 2016-132654 and is related to U.S. Appl. No. 15/596,039; with English Translation.

*Primary Examiner* — Toan C To
(74) *Attorney, Agent, or Firm* — Studebaker & Brackett PC

(57) ABSTRACT

In a rear suspension device of an automotive vehicle, a shock absorber is provided perpendicularly to a H-shaped lower arm in a side view, respective axis of resilient bushes of pivotal portions which pivotally support upper and lower arms at a vehicle-body side are configured to be parallel to a standard line which extends in a vehicle longitudinal direction in a plan view, and an imaginary axial line which interconnects respective centers of front and rear connection portions, via which the lower arm is connected to a wheel side, is configured to extend obliquely forward and inward relatively to the vehicle longitudinal direction.

4 Claims, 7 Drawing Sheets

(51) Int. Cl.
 *B60G 3/28* (2006.01)
 *B60G 7/00* (2006.01)
 *B60G 13/00* (2006.01)

(52) U.S. Cl.
 CPC .... *B60G 2200/18* (2013.01); *B60G 2204/128* (2013.01); *B60G 2204/143* (2013.01)

(58) Field of Classification Search
 USPC .... 280/124.134, 124.135, 124.136, 124.137, 280/124.142, 124.145
 See application file for complete search history.

(56) References Cited

U.S. PATENT DOCUMENTS

| | | | |
|---|---|---|---|
| 7,770,907 B2* | 8/2010 | Shimizu | B60G 3/20 280/124.134 |
| 8,573,615 B2* | 11/2013 | Kuwabara | B60G 3/06 180/253 |
| 2002/0043780 A1* | 4/2002 | Sandahl | B60G 3/20 280/124.135 |
| 2004/0100062 A1* | 5/2004 | Inoue | B60G 3/20 280/124.135 |
| 2004/0178596 A1* | 9/2004 | Furutani | B60G 3/20 280/86.758 |
| 2009/0134596 A1* | 5/2009 | Takahashi | B60G 7/001 280/124.179 |
| 2009/0194963 A1* | 8/2009 | Tomlin | B60G 9/00 280/124.116 |
| 2015/0061251 A1 | 3/2015 | Yamada et al. | |

FOREIGN PATENT DOCUMENTS

| | | |
|---|---|---|
| JP | 2004-276736 A | 10/2004 |
| JP | 2015-047910 A | 3/2015 |
| WO | 2007/045308 A1 | 4/2007 |

* cited by examiner

FIG. 1

REAR SUSPENSION STRUCTURE OF AUTOMOTIVE VEHICLE

BACKGROUND OF THE INVENTION

The present invention relates to a rear suspension structure of an automotive vehicle.

In general, a rear suspension structure in which resilient bushes which are provided at front and rear vehicle-body-side connection portions of a suspension arm are configured to have a small compliance, that is, configured to be hard, is superior in increasing the support rigidity of a rear wheel, thereby providing the quick responsiveness to a steering operation in vehicle cornering, in particular, so that this rear suspension structure is considered to be preferable for the vehicle controllability (handling stability). Meanwhile, there is a problem that the resilient bushes configured to be excessively hard may deteriorate the road-following property or the riding conformability.

Herein, an H-shaped arm as a lower arm which is applied to a conventional rear suspension structure is known as exemplified in European Patent No. 1937498 B2, for example. This H-shaped lower arm is configured to be connected to a vehicle-body side and a wheel side at two points, i.e., front and rear points, on each side, in a vehicle width direction, of a vehicle. Thereby, the H-shaped lower arm can have the superior wheel support rigidity against loads applied in a longitudinal direction, in the vehicle width direction, and in a rotational direction (windup direction).

The H-shaped lower arm disclosed in the above-described patent document is configured such that bush axes of the resilient bushes provided at the front and rear vehicle-body-side connection portions thereof extend obliquely relatively to the vehicle longitudinal direction in a plan view for the reason of setting a pitch center of the rear wheel at an appropriate position from an anti-lift geometry perspective and the like (see an axial line 8a in FIG. 3 of the above-described patent document).

In the above-described structure, however, there is a problem that there may occur twisting at the front and rear vehicle-body-side connection portions of the lower arm which is caused by a longitudinal load transmitted from the rear wheel. Conventionally, in order to suppress the twisting, the resilient bushes provided at the front and rear vehicle-body connection portions are configured to have different properties from each other.

However, in a case where the resilient bushes provided at the front and rear vehicle-body connection portions of the lower arm are configured to have the large compliance in order to suppress the twisting occurring thereat, the vehicle-width-direction compliance of the lower arm becomes so large that there is a concern that a merit of the H-shaped lower arm that the wheel support rigidity of the vehicle width direction (the rigidity against a lateral force) is properly high may be spoiled and thereby the handling stability of the vehicle may not be increased properly.

Meanwhile, in a case where the resilient bushes provided at the vehicle-body connection portions of the lower arm are configured to have the small compliance, i.e., configured to be hard, the road-following property or the riding conformability so deteriorate that there is a concern that the above-described anatomic problem may happen.

SUMMARY OF THE INVENTION

Accordingly, an object of the present invention is to provide a rear suspension structure of an automotive vehicle which can compatibly attain the handling stability and the road-following property/riding conformability, suppressing a cost increase properly.

The present invention is a rear suspension structure of an automotive vehicle which comprises an upper arm provided to be connected to a vehicle-body side and a wheel side, a H-shaped lower arm provided to be connected to the vehicle-body side and the wheel side, an auxiliary link, and a shock absorber provided to be connected to the lower arm and a vehicle body, wherein the shock absorber is provided perpendicularly to the lower arm in a side view, each connection portion of the upper and lower arms to the vehicle body is made of a pivotal portion which is configured to pivotally support each arm at the vehicle-body side via a resilient bush, the resilient bush having a bush axis which is configured to be parallel to a standard line extending in a vehicle longitudinal direction in a plan view, the lower arm is configured to be connected to the wheel side via front and rear connection portions, one of the front and rear connection portions is connected to the wheel side via the auxiliary link and the other connection portion is connected to the wheel side directly, not via the auxiliary link, and an imaginary axial line which interconnects respective centers of the front and rear connection portions is configured to extend obliquely forward and inward relatively to the vehicle longitudinal direction.

According to the present invention, the twisting of the lower arm and the shock absorber is so minimized that respective vertical moves of the lower arm and the shock absorber can be properly smooth. Thereby, the high rigidity of the wheel support rigidity of the resilient bushes and easy stroking of the lower arm and the shock absorber can be compatibly attained.

In an embodiment of the present invention, an upper portion of the shock absorber is pivotally supported at the vehicle body via an pivotal axis which is configured to be parallel to the standard line extending in the vehicle longitudinal direction in the plan view, and both the bush axis and the pivotal axis are configured to extend obliquely rearward and downward relatively to the standard line extending in the vehicle longitudinal direction in a side view.

According to this embodiment, the pitching resistance of the vehicle and the high wheel-support rigidity of the resilient bushes can be compatibly attained easily.

In another embodiment of the present invention, the front connection portion of the lower arm to the wheel side and a connection portion, via which the upper arm is configured to be connected to the wheel side, are provided in front of a rear-wheel drive axis, and a toe control link to control a toe angle of the rear wheel is provided in back of the rear-wheel drive axis.

According to this embodiment, a toe-in control of the rear wheel can be achieved precisely by increasing the wheel support rigidity of the vehicle width direction.

Other features, aspects, and advantages of the present invention will become apparent from the following description which refers to the accompanying drawings.

BRIEF DESCRIPTION OF THE DRAWINGS

FIG. 1 is a perspective view of a rear suspension device of a present embodiment.

DETAILED DESCRIPTION OF THE INVENTION

Figure 5:
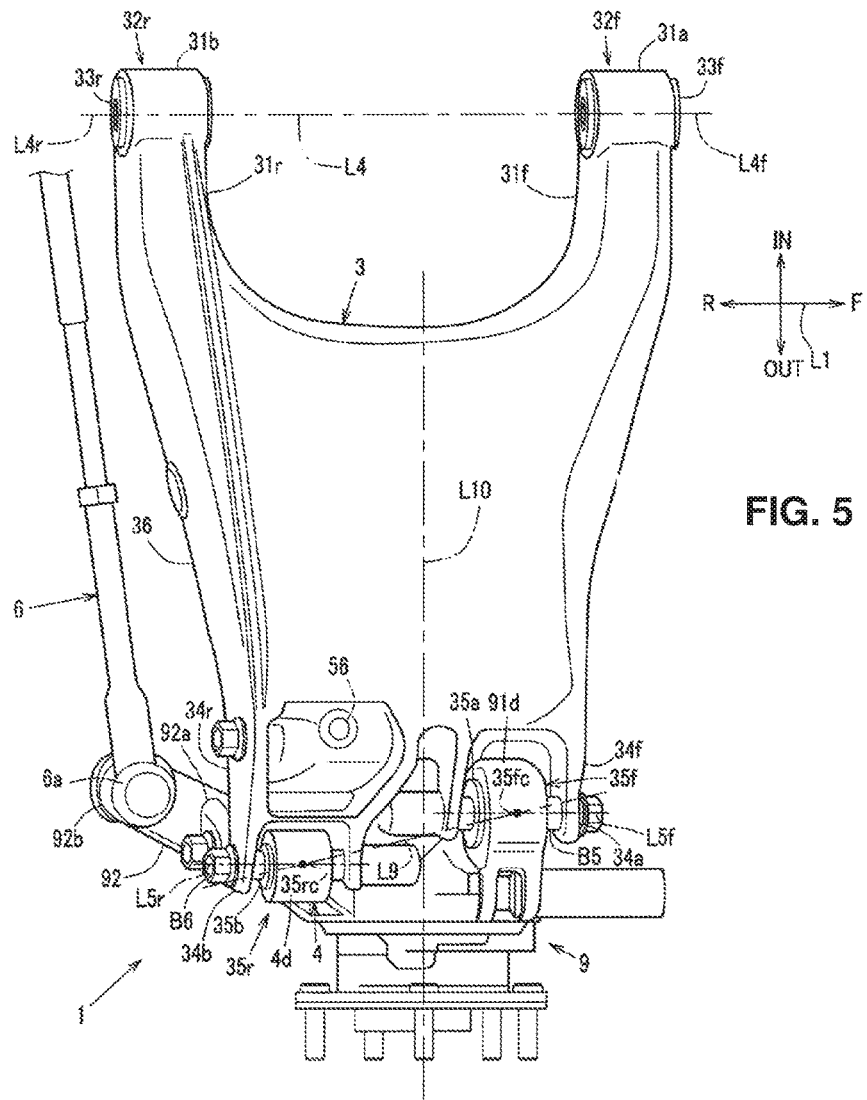
FIG. 5 is a bottom view of the rear suspension device of the present embodiment.

An embodiment of the present invention will be described specifically referring to the drawings. In the following discerption, an arrow F shows a vehicle forward side, an arrow R shows a vehicle rearward side, an arrow IN shows an inward side, in a vehicle width direction, of a vehicle, an arrow OUT shows an outward side, in the vehicle width direction, of the vehicle, and an arrow U shows a vehicle upward side in the figures. In FIG. 5, illustration of a damper unit 5 is omitted.

Herein, a pair of rear suspension devices 1 which are provided on right-and-left both sides at a rear portion of a vehicle body are symmetrical laterally, so the left-side rear suspension device 1 will be described. The suspension device 1 of the present embodiment comprises, as shown in FIG. 1, an I-shaped upper arm 2 and an H-shaped lower arm 3 which are respectively connected to a vehicle-body side and a wheel side (a wheel support 9), an auxiliary link 4, a damper unit 5 which is connected to the lower arm 3 and the vehicle body, and a toe control link 6.

Figure 1:
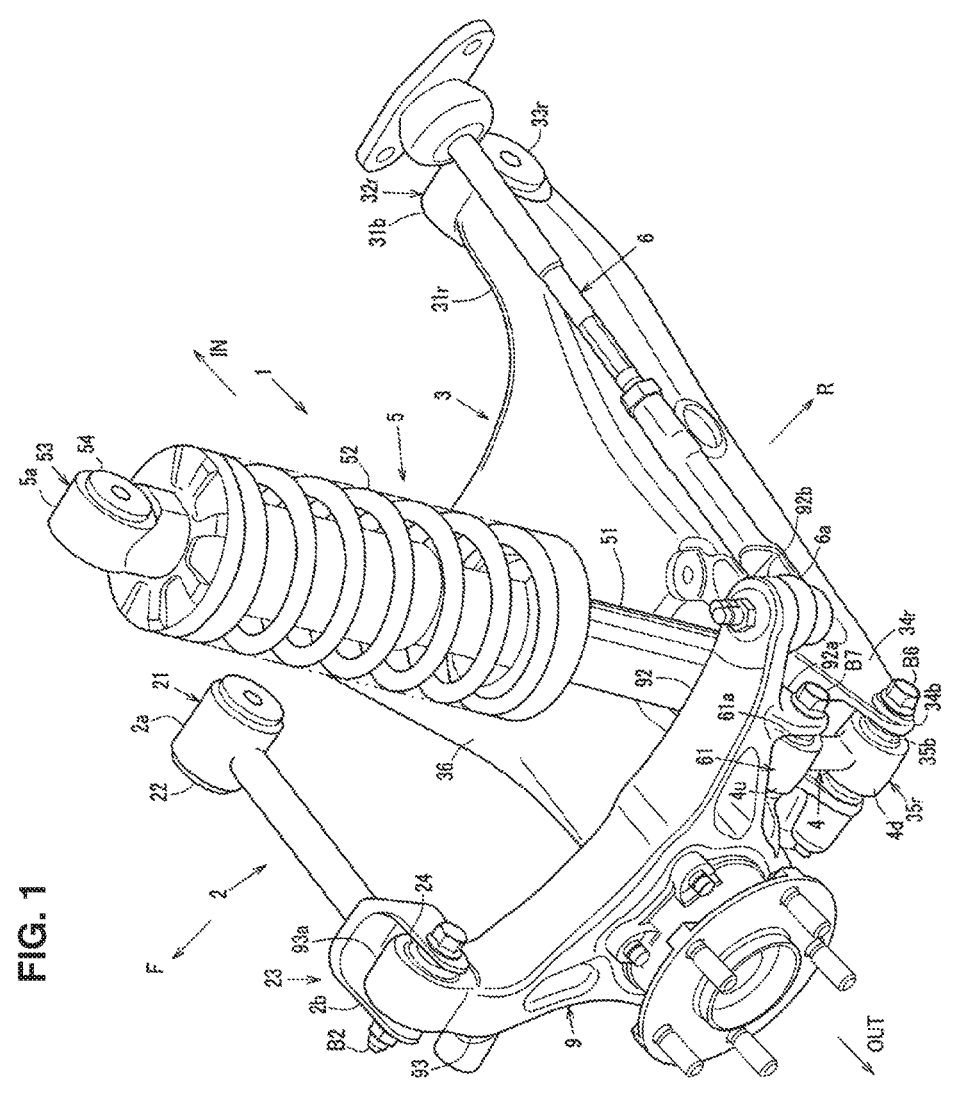
Figure 2:
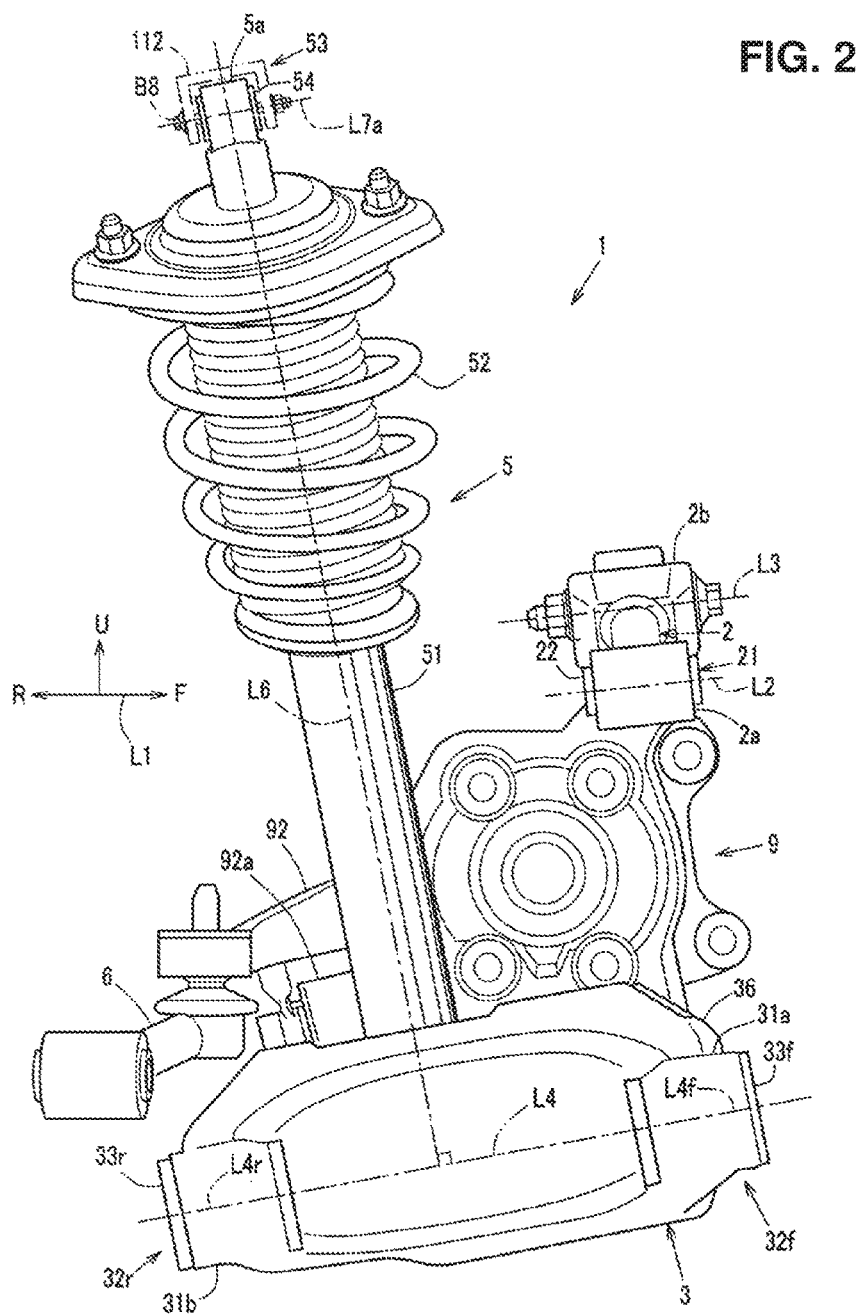
FIG. 2 is a side view of the rear suspension device of the present embodiment, when viewed from an inward side, in a vehicle width direction, of a vehicle.
Figure 4:
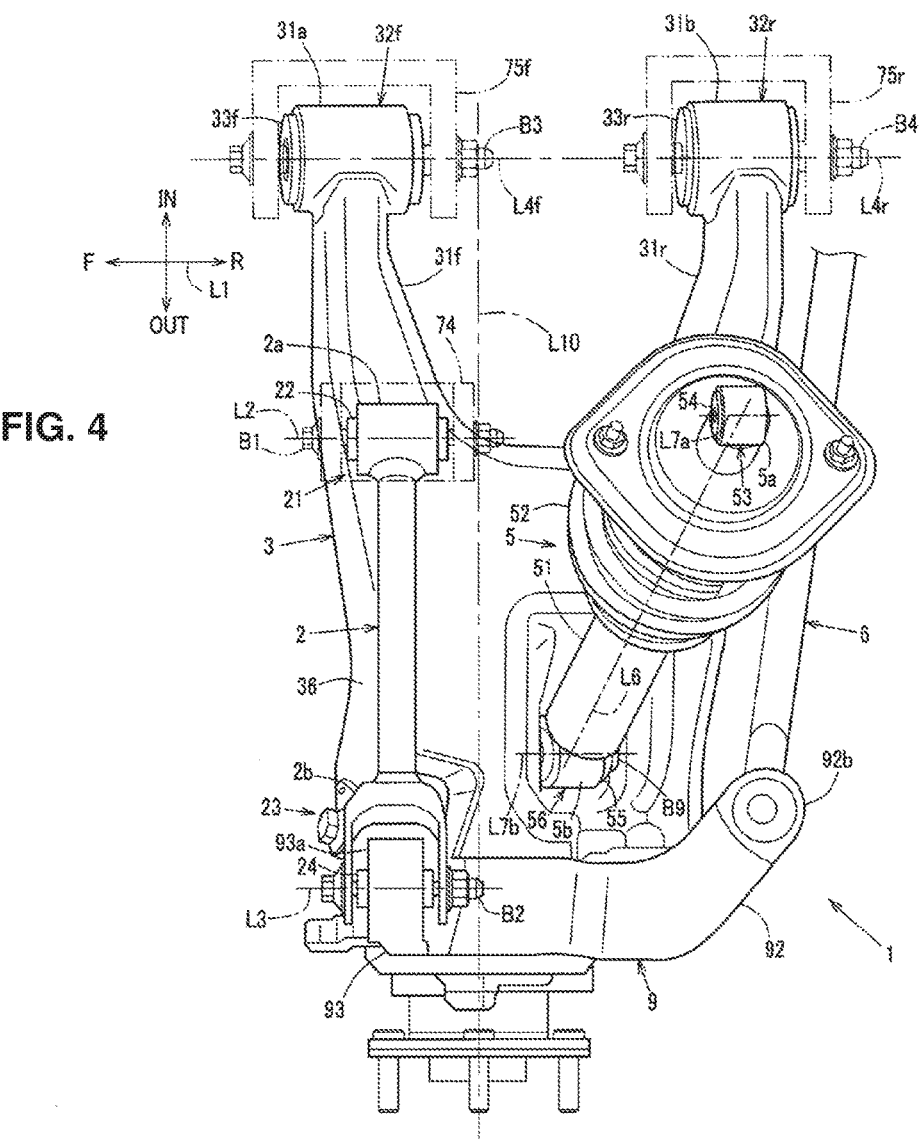
FIG. 4 is a plan view of the rear suspension device of the present embodiment.

As shown in FIGS. 1, 2 and 4, the upper arm 2 is an I-shaped (straight) arm which is arranged on an upper side as a suspension arm, and at an inward end 2a, in the vehicle width direction, of the upper arm 2 is provided a vehicle-body-side pivotal portion 21 which pivotally supports the upper arm 2 at the vehicle-body side. A cylindrical resilient bush 22 is provided to be inserted into the vehicle-body-side pivotal portion 21.

As shown in FIG. 4, the resilient bush 22 provided at the vehicle-body-side pivotal portion 21 of the upper arm 2 is supported at an attaching bracket 74 which is mounted to a reinforcing member (not illustrated) of the vehicle-body side via a bolt B1 which extends in a longitudinal direction at a central axis L2 of the resilient bush 22.

Figure 3:
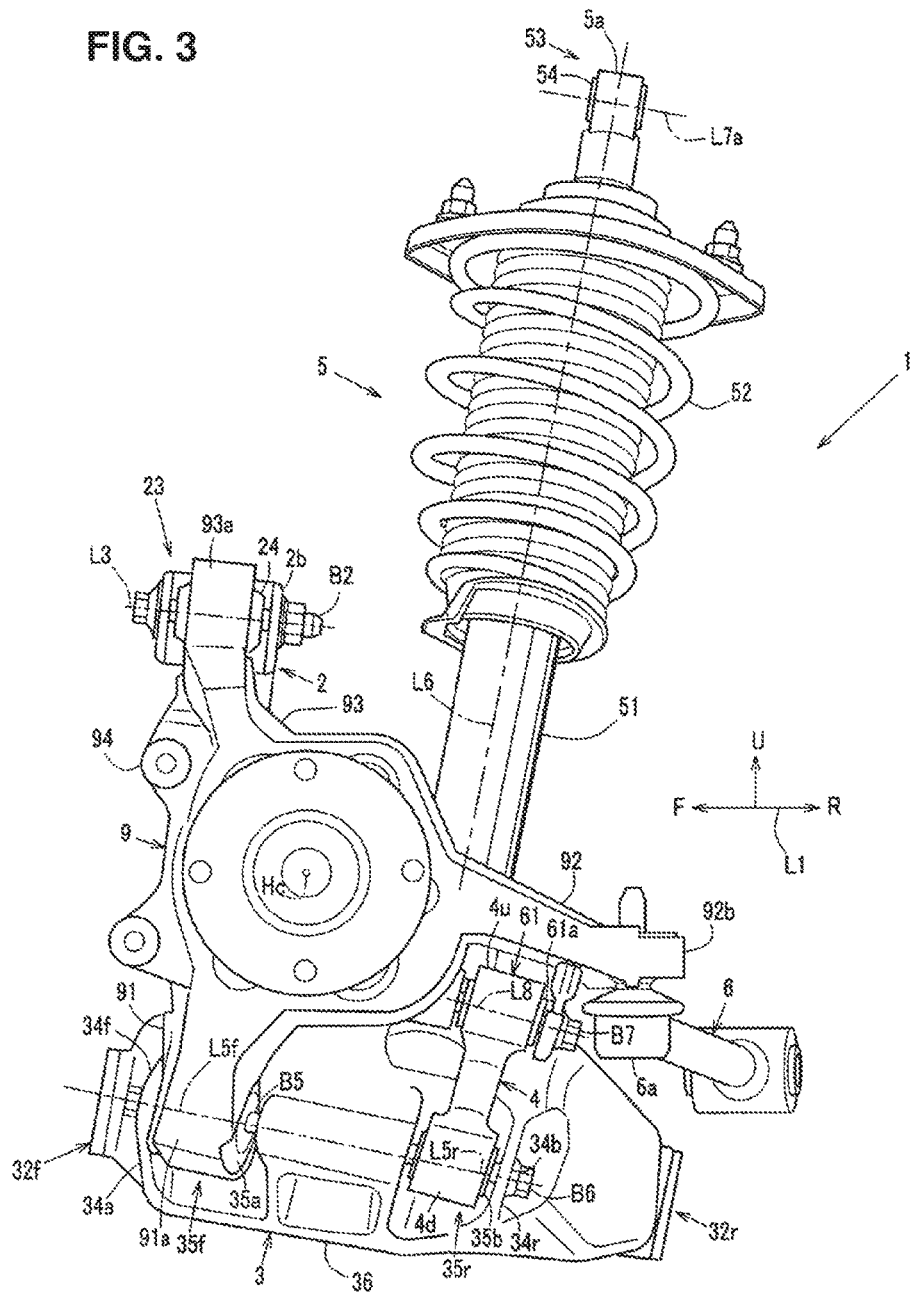
FIG. 3 is a side view of the rear suspension device of the present embodiment, when viewed from an outward side, in the vehicle width direction, of the vehicle.

Meanwhile, as shown in FIGS. 3 and 4, a wheel-side pivotal portion 23 which pivotally supports an upper end 93a of a front-upper arm portion 93 which extends forward and upward from a front-side area of a body portion of a wheel support 9 is provided at a vehicle-width-direction outward end 2b of the upper arm 2 via a bolt B2 and a cylindrical resilient bush 24.

As shown in FIGS. 4 and 5, the lower arm 3 is an H-shaped arm which is arranged on a lower side as another suspension arm, and front and rear vehicle-body-side arm portions 31 (a front vehicle-body-side arm portion 31f and a rear vehicle-body-side arm portion 31r) which are configured to extend toward the vehicle side from its vehicle-body-side portions spaced longitudinally apart from each other are integrally formed at a body portion 36 of the lower arm 3. As shown in FIGS. 2, 4 and 5, at a vehicle-width-direction inward end 31a of the front vehicle-body-side arm portion 31f and a vehicle-width-direction inward end 31b of the rear vehicle-body-side arm portion 31r are respectively provided vehicle-body-side pivotal portions 32 (a front vehicle-body-side pivotal portion 32f and a rear vehicle-body-side pivotal portion 32r). Cylindrical resilient bushes 33 (33f, 33r) are provided to be inserted into the front and rear vehicle-body-side pivotal portions 32f, 32r.

As shown in FIG. 4, the resilient bush 33f provided at the front vehicle-body-side pivotal portion 32f of the lower arm 32 is supported at an attaching bracket 75f which is mounted to a reinforcing member (not illustrated) of the vehicle-body side via a bolt B3 which extends in the longitudinal direction at a central axis L4f of the resilient bush 33f. The resilient bush 33r provided at the rear vehicle-body-side pivotal portion 32r of the lower arm 3 is supported at an attaching bracket 75r which is mounted to the reinforcing member of the vehicle-body side via a bolt B4 which extends in the longitudinal direction at a central axis L4r of the resilient bush 33r.

In the present embodiment, as shown in FIGS. 2, 4 and 5, the axis L4f of the front vehicle-body-side pivotal portion 32f and the axis L4r of the rear vehicle-body-side pivotal portion 32r of the lower arm 3 are provided coaxially. Herein, an axial line which extends straightly such that it passes the axis L4f of the front vehicle-body-side pivotal portion 32f and the axis L4r of the rear vehicle-body-side pivotal portion 32r of the lower arm 3 is set to be a lower-arm vehicle-body-side axis L4.

Meanwhile, as shown in FIGS. 3 and 5, front and rear wheel-side arm portions 34 (a front wheel-side arm portion 34f and a rear wheel-side arm portion 34r) which are configured to extend toward the wheel from the wheel-side portions of the lower arm 3 spaced longitudinally apart from each other are integrally formed at the body portion 36 of the lower arm 3. A vehicle-width-direction outward end 34a of the front wheel-side arm portion 34f is pivotally supported at a lower end 91a (see FIG. 3) of a front lower arm portion 91 which extends forward and downward from a front-side area of the wheel support 9 via a bolt B5 and a cylindrical resilient bush 35a, whereby a front wheel-side pivotal portion 35f is formed.

Meanwhile, as shown in FIGS. 1, 3 and 5, a vehicle-width-direction outward end 34b of the rear wheel-side arm portion 34r of the lower arm 3 and the wheel support 9 are connected to each other via the auxiliary link 4.

Specifically, the auxiliary link 4 extends perpendicularly to the lower arm 3 (see FIG. 3), the vehicle-width-direction outward end 34b of the rear wheel-side arm portion 34r of the lower arm 3 and a lower end portion 4d of the auxiliary link 4 are pivotally supported at each other via a cylindrical resilient bush 35b and an axis (a bolt B6), whereby a rear lower wheel-side pivotal portion 35r is formed. As shown in FIGS. 1 and 3, an upper end portion 4u of the auxiliary link 4 and a base end portion 92a (see FIG. 1) of a rearward arm portion 92 which extends rearward from a rear-side area of the wheel support 9 are pivotally supported at each other via a cylindrical resilient bush 61a and an axis (a bolt B7) (see FIG. 3), whereby a rear upper wheel-side pivotal portion 61 is formed. In FIG. 3, reference character 94 denotes a caliper attaching hole for attaching a brake caliper, not illustrated.

Figure 6:
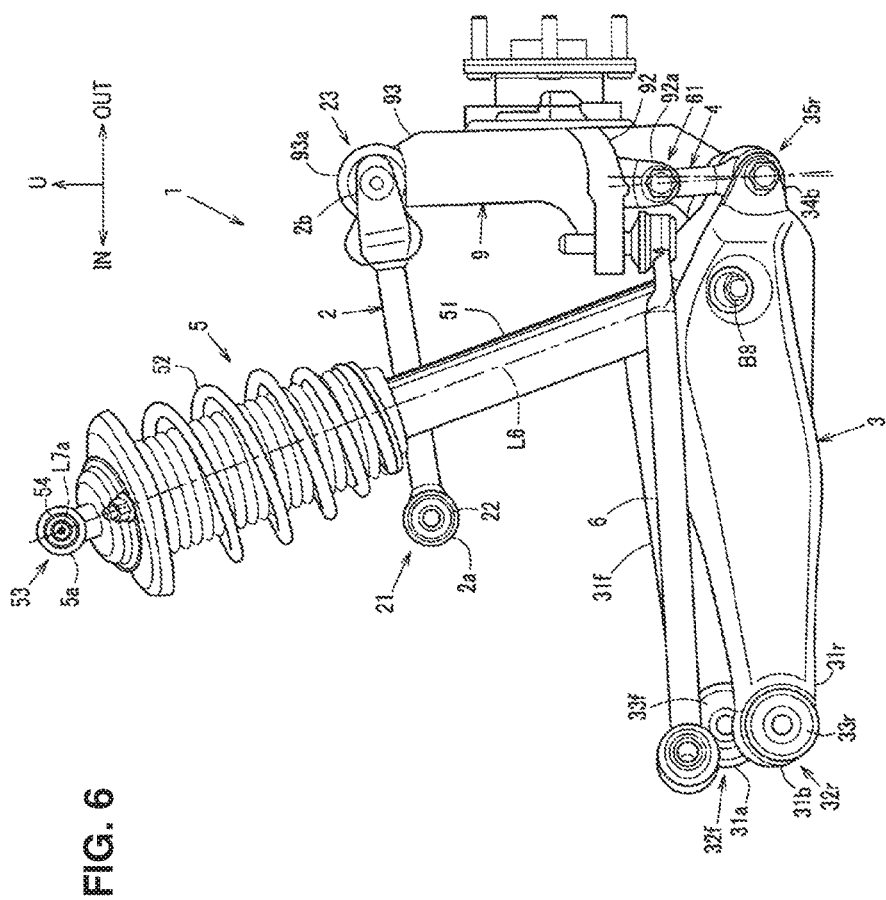
FIG. 6 is a back view of the rear suspension device of the present embodiment.

As shown in FIG. 6, the rear upper wheel-side pivotal portion 61 which is positioned above the rear lower wheel-side pivotal portion 35r is arranged slightly on the inward side, in the vehicle width direction, of the rear lower wheel-side pivotal portion 35r. Thereby, a rear wheel (not illustrated) changes to a toe-in state in vehicle braking, so that the vehicle can be stable.

Herein, in a case where the rear suspension device 1 of the present embodiment uses the H-shaped lower arm 3, the rigidity can be increased, but there is a concern that a toe-angle change of the wheel may not be caused properly. Accordingly, as shown in FIGS. 1, 3 and 5, the rear suspension device 1 of the present embodiment is configured such that any one side, in the longitudinal direction, of the lower arm 3 (the rear side of the lower arm 3 in the present embodiment) is connected to the wheel support 9 (knuckle member) via the auxiliary link 4. Thereby, the compliance for the toe-angle change of the rear wheel is made so large that when a load is applied to the rear wheel in the vertical direction, in the longitudinal direction, or in the vehicle width direction, the rear wheel can be controlled so as to be properly in the toe-in state by utilizing the toe control link 6.

Further, the rear wheel-side arm portion 34r of the lower arm 3 which pivotally supports the lower end portion 4b of the auxiliary link 4 is arranged on the outward side, in the vehicle width direction, of the base end portion 92a (see FIG. 1) of the wheel support 9 which pivotally supports the upper end portion 4u of the auxiliary link 4. Thereby, when the wheel support 9 which supports the brake caliper is rotated forward in the vehicle braking, the upper end portion 4a of the auxiliary link 4 so twists outward in the vehicle width direction that the rear portion of the wheel support 9 can move outward. Consequently, the rear wheel can be controlled so as to be in the toe-in state.

As shown in FIGS. 1, 2-4 and 6, the above-described damper unit 5 is connected to the vehicle body and the lower arm 3, and comprises a shock absorber 51 and a coil spring 52. As shown in FIGS. 2, 3 and 6, the coil spring 52 of the damper unit 5 is arranged around an upper portion of the shock absorber 51 such that respective central axes L6 of the shock absorber 51 and the coil spring 52 are coaxial, and the coaxial central axes L6 extend in the vertical direction which is perpendicular to the axes L4f, L4r of the lower arm 3 in the side view (see FIG. 2). The damper unit 5 (the shock absorber 51) positioned between the vehicle body and the lower arm 3 includes a damper upper-end pivotal portion 53 which pivotally supports the damper unit at the vehicle body at the upper end portion 5a of the shock absorber 51.

Further, as shown in FIG. 4, the bolts B1, B3, B4 (the axes L2, L4f, L4r) which pivotally support the respective resilient bushes 22, 33f, 33r of all of the vehicle-body-side pivotal portions 21, 32f, 32r (the vehicle-body-side pivotal portion 21 of the upper arm 2, the front and rear vehicle-body-side pivotal portions 32f, 32r of the lower arm 3) of the upper and lower arms 2, 3 are arranged in parallel to a vehicle-longitudinal-direction standard line L1 in the plan view.

Moreover, in the present embodiment, bolts B2, B8 (FIG. 2), B9 (axes L3, L7a, L7b) which pivotally support respective resilient bushes 22, 54, 55 of the wheel-side pivotal portion 23 of the upper arm 2, the damper upper-end pivotal portion 53, and a damper lower-end pivotal portion 56 are arranged in parallel to the vehicle-longitudinal-direction standard line L1 in the plan view as shown in FIG. 4.

Also, as shown in FIG. 5, an imaginary axial line L9 (a lower-arm wheel-side axis L9) which interconnects a center 35fc of the front wheel-side pivotal portion 35f of the lower arm 3 and a center 35rc of the rear lower wheel-side pivotal portion 35r extends obliquely forward and inward in a bottom view.

Herein, the center 35fc of the front wheel-side pivotal portion 35f of the lower arm 3 means a position which is located on an axial line L5f extending in the longitudinal direction of the front wheel-side pivotal portion 35f and at a center, in the longitudinal direction, of the front wheel-side pivotal portion 35f. Likewise, the center 35rc of the rear lower wheel-side pivotal portion 35r means a position which is located on an axial line L5r extending in the longitudinal direction of the rear lower wheel-side pivotal portion 35r and at a center, in the longitudinal direction, of the rear lower wheel-side pivotal portion 35r.

As shown in FIG. 2, the respective axes L2, L4f, L4r, L7a of the vehicle-body-side pivotal portions 21, 32f, 32r, 53 of the upper and lower arms 2, 3 and the damper upper-end portion 5a extend obliquely rearward and downward relatively to the vehicle-longitudinal-direction standard line L1.

Specifically, the axis L2 of the vehicle-body-side pivotal portion 21 of the upper arm 2, the respective axes L4f, L4r of the front and rear vehicle-body-side pivotal portions 32f, 32r (the front vehicle-body-side pivotal portion 32f and the rear vehicle-body-side pivotal portion 32r), and the axis L7a of the damper upper-end pivotal portion 53 extend in parallel to each other, extending obliquely rearward and downward relatively to the vehicle-longitudinal-direction standard line L1 (see FIG. 2).

Further, in the present embodiment as shown in FIG. 3, the axis L2 of the vehicle-body-side pivotal portion 21 of the upper arm 2, the respective axes L4f, L4r of the front and rear vehicle-body-side pivotal portions 32f, 32r (the front vehicle-body-side pivotal portion 32f and the rear vehicle-body-side pivotal portion 32r), and the axis L7a of the damper upper-end pivotal portion 53 extend in parallel to each other, extending obliquely rearward and downward relatively to the vehicle-longitudinal-direction standard line L1 (see FIG. 2).

Respective axes L3, L5f, L5r, L8 of the wheel-side pivotal portion 23 of the upper arm 2, the front and rear wheel-side pivotal portions 35 (the front wheel-side pivotal portion 35f and the rear lower wheel-side pivotal portion 35r) of the lower arm 3, and the rear upper wheel-side pivotal portion 61 extend in parallel to each other, extending obliquely rearward and downward relatively to the vehicle-longitudinal-direction standard line L1.

The above-described damper unit 5 (the shock absorber 51) is provided perpendicularly to the lower arm 3 in the side view as shown in FIGS. 2 and 3. Specifically, the central axis L6 of the damper unit 5 is positioned on an axial line perpendicular to the lower-arm vehicle-body-side axis L4 in the side view (see FIG. 2).

The upper portion of the damper unit 5, that is, upper portions of the shock absorber 51 and the coil spring 52 provided around the upper portion of the shock absorber 51 are arranged on the outward side, in the vehicle width direction, of a rear side frame, not illustrated, such that they overlap the rear side frame in the vertical direction. Herein, right-and-left rear side frames are vehicle-body reinforcing members which are provided to extend in the vehicle longitudinal direction on right-and-left both sides of a rear portion of the vehicle.

Moreover, as shown in FIGS. 1, 4 and 5, the above-described toe control link 6 is a link which is provided to extend in the vehicle width direction, and as shown in FIGS. 1, 3 and 5, an outward end 6a, in the vehicle width direction, of the toe control link 6 is connected to a rear end 92b (a tip) of the rearward arm portion 92 of the wheel support 9 via a ball joint.

As shown in FIGS. 3-5, the front wheel-side pivotal portion 35f of the lower arm 3 and the wheel-side pivotal portion 23 of the upper arm 2 are arranged in front of a rear-wheel drive axis L10 (an output shaft L19 of a differential), and the toe control link 6 is arranged in back of the rear-wheel drive axis L10 in order to provide the toe-angle change with preferable characteristics in the vehicle braking or cornering. Herein, a wheel center Hc (see FIG. 3) of the wheel support 9 is positioned on the rear-wheel drive axis L10.

The above-described rear suspension device 1 of the automotive vehicle of the embodiment comprises the I-shaped upper arm 2 and the H-shaped lower arm 3 which are respectively provided to be connected to the vehicle-body side and the wheel side, the auxiliary link 4, and the damper unit 5 (the shock absorber 51) which is provided to be connected to the lower arm 3 and the vehicle body (see FIG. 1), wherein the damper unit 5 is provided perpendicularly to the lower arm 3 in the side view (see FIGS. 2 and 3), the connection portions of the upper and lower arms 2, 3 to the vehicle body are respectively made of the vehicle-body-side pivotal portion 21 which pivotally supports the upper arm 2 at the vehicle-body side via the resilient bush 22 and the front and rear vehicle-body-side pivotal portions 32$f$, 32$r$ which pivotally support the lower arm 3 at the vehicle-body side via the resilient bushes 33$f$, 33$r$ (see FIG. 4), these resilient bushes 22, 33$f$, 33$r$ having the bush axes L2, L4$f$, L4$r$ which are configured to be parallel to the vehicle-longitudinal-direction standard line L1 in the plan view (see the same figures), the rear lower wheel-side pivotal portion 35$r$ of the lower arm 3 is connected to the wheel side via the auxiliary link 4 (see FIGS. 1, 3 and 5) and the front wheel-side pivotal portion 35$f$ is connected to the wheel side (the wheel support 9) directly, not via the auxiliary link 4 (see the same figures), and the imaginary axial line L9 which interconnects the center 35$fc$ of the front wheel-side pivotal portion 35$f$ and the center 35$rc$ of the rear lower wheel-side pivotal portion 35$r$ is configured to extend obliquely forward and inward relatively to the vehicle longitudinal direction (see FIG. 5).

According to the present device, twisting of the lower arm 3 and the shock absorber 51 is so minimized that the vertical moves of the lower arm 3 and the shock absorber 51 can be smooth. Thereby, the high rigidity of the wheel support rigidity, in the vehicle width direction, of the resilient bushes 22, 33$f$, 33$r$, 54 and the riding conformability can be compatibly attained.

Figures 7A, 7B:
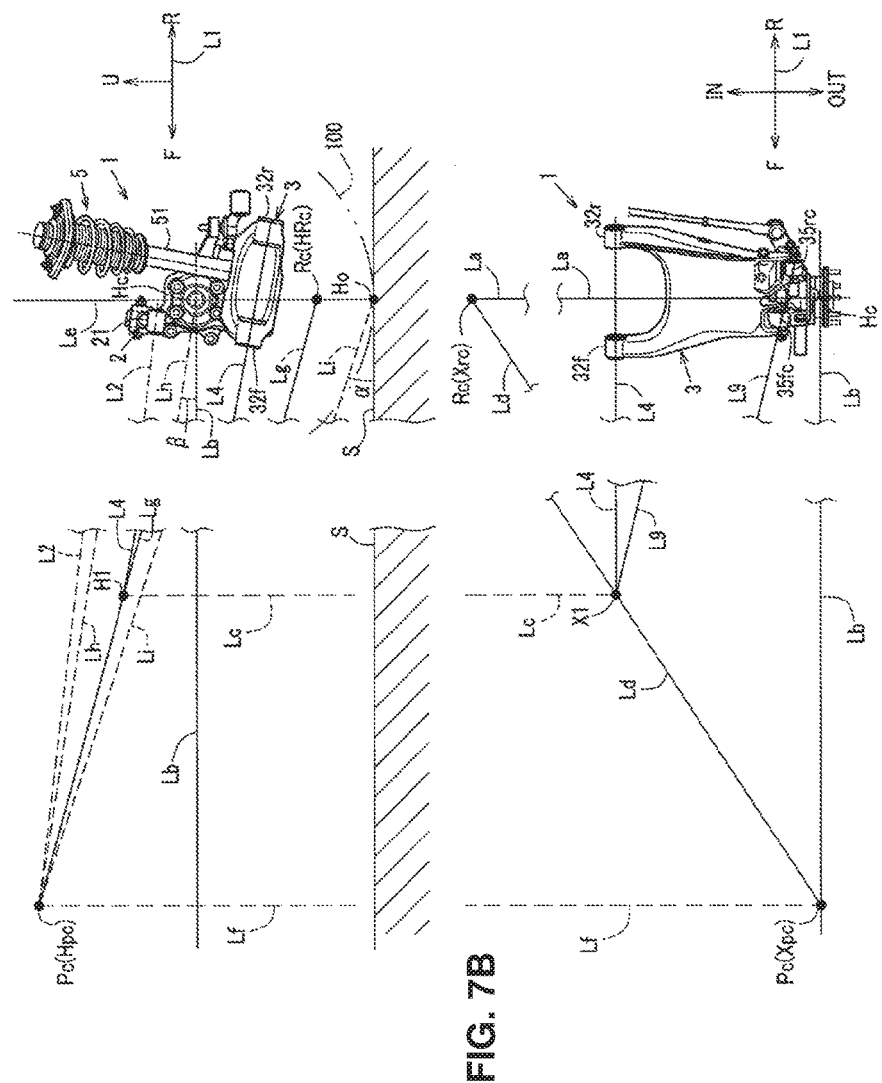
FIGS. 7A and 7B are explanatory diagrams of a pitch center and various points/axes for specifying the pitch center.

In addition, in the present embodiment as shown in FIG. 5, since the imaginary axial line L9 (the lower-arm wheel-side axis L9) interconnecting the center 35$fc$ of the front wheel-side pivotal portion 35$f$ and the center 35$rc$ of the rear lower wheel-side pivotal portion 35$r$ of the lower arm 3 extends obliquely forward and inward relatively to the vehicle longitudinal direction, as shown in FIG. 7B, a cross point X1 of the lower-arm wheel-side axis L9 and the lower-arm vehicle-body-side axis L4 can be created surely, thereby properly setting a pitch center Pc (point Xpc).

FIG. 7B is an explanatory diagram which schematically shows, in the bottom view, a position of the pitch center of the rear suspension device 1 and various points and axes to identify the above-described position of the pitch center. In FIG. 7B, the axis L9 is the lower-arm wheel-side axis, the axis L4 is the lower-arm vehicle-body-side axis, and the point X1 is a cross point of the axis L9 and the axis L4. An axis La is a wheel vehicle-width-direction axis which extends in the vehicle width direction so as to pass the wheel center Hc, a point Xrc is a position, in the bottom view, of a roll center Rc which is positioned on the wheel vehicle-width-direction axis, an axis Lb is a wheel longitudinal-direction axis which extends in the longitudinal direction so as to pass the wheel center Hc, and a point Xpc is a cross point of a straight line Ld and the axis Lb, which is a position, in the bottom view, of the pitch center Pc.

According to the present device, the pitch center Pc can be set properly, the road-following property and the riding conformability can be improved by making the vertical moves of the upper and lower arms 2, 3 and the shock absorber 51 properly smooth, and the vehicle-body controllability can be improved, keeping the vehicle-width-direction geometries, such as a camber angle, by improving the wheel support rigidity of the vehicle width direction.

In the embodiment of the present invention, the upper end portion 5$a$ of the shock absorber 51 is pivotally supported at the vehicle body via the bolt B8 (see FIG. 2) as a pivotal axis which is parallel to the vehicle-longitudinal-direction standard line L1 in the plan view, and as shown in FIG. 2, the bolts B1, B3 (see FIG. 4), B4, B8 which pivotally support the upper and lower arms 2, 3 and the upper end portion 5$a$ of the shock absorber 5 at the vehicle body extend obliquely rearward and downward relatively to the vehicle-longitudinal-direction standard line L1.

According to this embodiment, the proper pitching resistance and the hard resilient bush 54 can be compatibly attained easily.

Specifically, according to the above-described device, since the axes L4$f$, L4$r$ of the front and rear vehicle-body-side pivotal portions 32$f$, 32$r$ of the H-shaped lower arm 3, that is, the lower-arm vehicle-body-side axis L4 is configured to extend obliquely rearward and downward relatively to the vehicle-longitudinal-direction standard line L1 in the side view (see FIG. 2), the pitch center Pc (point Hpc) can be set at a position which is located obliquely upward and forward relatively to the rear wheel, that is, located above the wheel-longitudinal-direction axis Lb (i.e., a recession angle can be secured) as shown in FIG. 7A. Thus, by making the level (height position) of the pitch center Pc properly high, appropriate anti-lift or anti-squat geometries (properties) in the vehicle braking or quick starting can be provided.

FIG. 7A is an explanatory diagram which schematically shows, in the side view, a position of the pitch center of the rear suspension device 1 and the various points/axes to identify the above-described position of the pitch center. In FIG. 7A, the axis L4 is the lower-arm vehicle-body-side axis, and a point H1 is a cross point of the axis L4 and a straight line Lc. An axis Le is a wheel vertical-direction axis which extends in the vertical direction so as to pass the wheel center Hc, a point Hrc is a position, in the side view, of the roll center Rc which is located on the wheel vertical-direction axis Le, a straight line Lg is the one passing the point H1 and the point Hrc, and a point Hpc is a cross point of the straight line Lg and the straight line Lf, which is a position, in the side view, of the pitch center Pc. In FIG. 7A, an angle between a road surface S and a straight line Li which interconnects the point Hpc and a road-surface contact point Ho of the rear wheel denotes an anti-lift angle α, and an angle β between the wheel-longitudinal-direction axis Lb and a straight line Lh which interconnects the point Hpc and the wheel center Hc denotes an anti-squat angle.

Further, in the present embodiment, the axis L2 of the vehicle-body-side pivotal portion 21 of the I-shaped upper arm 2 and the axis L7$a$ of the upper-end pivotal portion 53 are configured to extend obliquely rearward and downward relatively to the vehicle-longitudinal-direction standard line L1 in the side view (see FIG. 2), in addition to the axes L4 (L4$f$, L4$r$) of the front and rear vehicle-body-side pivotal portions 32$f$, 32$r$ of the H-shaped lower arm 3, as described above. For example, the vehicle-body-side pivotal portion 21 of the upper arm 2 is configured such that its axis L2 (the upper-arm wheel-side axis L2) passes the pitch center Pc (the point Hpc).

According to the above-described device, since the upper arm 2 and the shock absorber 51 can be made to smoothly stroke (swing) perpendicularly to the lower arm 3, without twisting, the compliance of the perpendicular direction can be properly increased.

Thereby, in the present embodiment, all of the vehicle-body-side pivotal portions 21, 32f, 32r, 5a of the upper and lower arms 2, 3 and the shock absorber 51 can be made to move quickly, without twisting, in a winding-up move of the rear wheel, securing the properly high level of the pitch center Pc, thereby further improving the pitching resistance, the road-following property, and the riding conformability. Further, by further improving the road-following property, slipping and the like are so prevented that the vehicle controllability can be improved more.

Specifically, the rear suspension device 1 of the present embodiment can decrease the magnitude of a load which is received thereby when the rear wheel rides over a stepwise portion, by controlling the rear wheel so as to smoothly stroke (swing) in an obliquely rearward-and-upward direction.

Further, since the shock absorber 51 is provided perpendicularly to the lower arm 3 (see FIGS. 2 and 3), the twisting of the upper end portion 5a of the shock absorber 51 can be minimized.

Moreover, in the embodiment of the present invention, the front wheel-side pivotal portion 35f as the front wheel-side connection portion of the lower arm 3 and the wheel-side pivotal portion 23 as the wheel-side connection portion of the upper arm 2 are provided in front of the rear-wheel drive axis L10, and the toe control link 6 is provided in back of the rear-wheel drive axis L10 (see FIG. 4).

According to the above-described device, the toe-in control of the rear wheel can be achieved precisely by increasing the wheel support rigidity of the vehicle width direction.

Specifically, in the rear suspension device of the above-described patent document (European Patent No. 1937498), a front wheel-side pivotal portion (6b) of a lower arm (5) is provided in front of a rear-wheel drive axis (4) (an output shaft (4)) (see FIG. 3 of the patent document). Meanwhile, an upper arm (10) extends in the vehicle width direction at a positon which substantially matches the rear-wheel drive axis (4) in the longitudinal direction, and a wheel-side pivotal portion provided at an outward end, in the vehicle width direction, of the upper arm (10) which is connected to a hub support (3) is arranged substantially right above the rear-wheel drive axis (4) (see the same figure). Further, a toe control link (11) is connected to a portion of the hub support which is positioned in back of the rear-wheel drive axis (4) at an outward end, in the vehicle width direction, thereof, so that the toe control link (11) is positioned in back of the rear-wheel drive axis (4) in the plan view (see the same figure).

According to the above-described device of the patent document, since the upper arm (10) extends in the vehicle width direction at the positon which substantially matches the rear-wheel drive axis (4) in the longitudinal direction as described above, the toe controllability can be improved. However, there is a concern that an inward force caused by the rear wheel's moving toward the toe-in state may not be received efficiently by the upper arm (10).

In the present embodiment, however, not only the front wheel-side pivotal portion 35f of the lower arm 3 but the wheel-side pivotal portion 23 of the upper arm 2 are positioned in front of the rear-wheel drive axis L10 as described above, so that a longitudinal pitch (distance) between the control link 6 and the upper arm 2 can be set to be greater than that of the above-described patent document.

Thereby, the above-described force (moment) acting so as to move the rear wheel toward the toe-in state more can be received by the I-shaped upper arm 2 efficiently and properly, for example.

Accordingly, the support rigidity against the load of the vehicle width direction can be increased properly by the I-shaped upper arm 2 together with the H-shaped lower arm 3, and the rear wheel's toe-in controllability can be achieved precisely and easily, without relying on the rigidity of the resilient bush 24.

The rear suspension structure of the present invention corresponds to the rear suspension device 1 of the present embodiment. Likewise, the pivotal portion configured to pivotally support each arm at the vehicle-body side corresponds to the vehicle-body-side pivotal portion 21 of the upper arm 2 and the front and rear vehicle-body-side pivotal portions 32f, 32r of the lower arm 3, one of the front and rear wheel-side connection portions of the lower arm corresponds to the rear lower wheel-side pivotal portion 35r, the other of the front and rear wheel-side connection portions of the lower arm corresponds to the front wheel-side pivotal portion 35f, the bush axes of the resilient bushes via which the upper and lower arms are pivotally supported at the vehicle-body side correspond to the bolts B1, B3, B4 (the axes L2, L4f, L4r), the pivotal axis via which the upper portion of the shock absorber is pivotally supported at the vehicle body corresponds to the bolt B8 (the axis L7a), and the front connection portion of the lower arm to the wheel side corresponds to the front wheel-side pivotal portion 35f, and the connection portion via which the upper arm is connected to the wheel side corresponds to the wheel-side pivotal portion 23. However, the present invention should not be limited to the above-described embodiment.

For example, the upper arm is not limited to the I-shaped upper arm 2 like the present embodiment, but an A-shaped of H-shaped link may be applied. In a case where the H-shaped link is applied, it is preferable similarly to the lower arm 3 that an imaginary axial line which interconnects respective centers of the front and rear connection portions of the upper arm 2 be configured to extend obliquely forward and inward relatively to the vehicle longitudinal direction, which is not illustrated.

Further, while the rear lower wheel-side pivotal portion 35r of the lower arm 3 is connected to the wheel side via the auxiliary link 4 (see FIGS. 1, 3 and 5) and the front wheel-side pivotal portion 35f is connected to the wheel side (the wheel support 9) directly, not via the auxiliary link 4 (see the same figures) in the present embodiment, the front wheel-side pivotal portion of the lower arm may be connected to the wheel side via the auxiliary link and the rear wheel-side pivotal portion is connected to the wheel side directly, not via the auxiliary link, which is not illustrated.

Moreover, the above-described embodiment is configured such that the vehicle-body-side connection portion of the upper arm 2 is the wheel-side pivotal portion 22 which is provided with the resilient bush 22 and the bolt B1 (see FIG. 4), the vehicle-body-side connection portions of the lower arm 3 are the vehicle-body-side pivotal portions 32f, 32r which are provided with resilient bushes 33f, 33r and the bolts B3, B4 (see the same figure), the front wheel-side pivotal portion of the lower arm is the front wheel-side pivotal portion 35f which is provided with the resilient bush 35a and the bolt B5 (see FIG. 5), the wheel-side pivotal portion of the upper arm 2 is the wheel-side pivotal portion 23 which is provided with the resilient bush 24 and the bolt B2 (see FIG. 4), the connection portion connecting the lower end portion 4d of the auxiliary link 4 and the lower arm 3 is the rear lower vehicle-body-side pivotal portion 35r which is provided with the resilient bush 35b and the bolt B6 (see FIGS. 3 and 5), and the connection portion connecting the upper and portion 4u of the auxiliary link 4 and the base end portion 92b of the rear arm portion 92 of the wheel support 9 (see FIG. 3). The present invention is not limited to the above-described configuration, and at least one of the above-described connection portions may be made of a pillow ball joint (a spherical bearing, a ball bush).

Also, while the axial line L5f of the front wheel-side pivotal portion 35f and the axial line L5r of the rear wheel-side pivotal portion 35r of the lower arm 3 are the axes which extend in parallel to the vehicle-longitudinal-direction standard line L1 in the plan view and the imaginary axial line L9 interconnecting the center 35fc of the front wheel-side pivotal portion 35f and the center 35rc of the rear lower wheel-side pivotal portion 35r of the lower arm 3 extend obliquely forward and inward relatively to the vehicle longitudinal direction in the plan view (see FIG. 5) in the present embodiment, the axial line L5 of the front wheel-side pivotal portion 35f and the axial line L5r of the rear wheel-side pivotal portion 35r themselves may be configured to extend obliquely forward and inward in the plan view.

Herein, in a case where the front wheel-side pivotal portion 35f and the rear wheel-side pivotal portion 35r are the front wheel-side connection portion and the rear wheel-side connection portion which use the pillow ball joints, respectively, the centers of these front and rear wheel-side connection portions can be set at the centers 35fc, 35rc (rotational centers) of the balls.

What is claimed is:

1. A rear suspension structure of an automotive vehicle, comprising:
    an upper arm provided to be connected to a vehicle-body side and a wheel side;
    a H-shaped lower arm provided to be connected to the vehicle-body side and the wheel side;
    an auxiliary link; and
    a shock absorber provided to be connected to the lower arm and a vehicle body,
    wherein said shock absorber is provided perpendicularly to said lower arm in a side view, each connection portion of said upper and lower arms to the vehicle body is made of a pivotal portion which is configured to pivotally support each arm at the vehicle-body side via a resilient bush, the resilient bush having a bush axis which is configured to be parallel to a standard line extending in a vehicle longitudinal direction in a plan view, said lower arm is configured to be connected to the wheel side via front and rear connection portions, one of said front and rear connection portions is connected to the wheel side via said auxiliary link and the other connection portion is connected to the wheel side directly, not via the auxiliary link, and an imaginary axial line which interconnects respective centers of said front and rear connection portions is configured to extend obliquely forward and inward relatively to the vehicle longitudinal direction.

2. The rear suspension structure of the automotive vehicle of claim 1, wherein an upper portion of said shock absorber is pivotally supported at the vehicle body via an pivotal axis which is configured to be parallel to the standard line extending in the vehicle longitudinal direction in the plan view, and both said bush axis and said pivotal axis are configured to extend obliquely rearward and downward relatively to the standard line extending in the vehicle longitudinal direction in a side view.

3. The rear suspension structure of the automotive vehicle of claim 2, wherein said front connection portion of the lower arm to the wheel side and a connection portion, via which said upper arm is configured to be connected to the wheel side, are provided in front of a rear-wheel drive axis, and a toe control link to control a toe angle of the rear wheel is provided in back of the rear-wheel drive axis.

4. The rear suspension structure of the automotive vehicle of claim 1, wherein said front connection portion of the lower arm to the wheel side and a connection portion, via which said upper arm is configured to be connected to the wheel side, are provided in front of a rear-wheel drive axis, and a toe control link to control a toe angle of the rear wheel is provided in back of the rear-wheel drive axis.

* * * * *